(12) United States Patent
Wei et al.

(10) Patent No.: US 9,958,605 B2
(45) Date of Patent: May 1, 2018

(54) WEAK REFLECTION TERAHERTZ FIBER OPTIC DEVICES FOR DISTRIBUTED SENSING APPLICATIONS

(71) Applicant: Rhode Island Board of Education, State of Rhode Island and Providence Plantations, Providence, RI (US)

(72) Inventors: Tao Wei, West Kingston, RI (US); Zhen Chen, Kingstown, RI (US); Gerald Hefferman, Warwick, RI (US)

(73) Assignee: RHODE ISLAND BOARD OF EDUCATION, STATE OF RHODE ISLAND AND PROVIDENCE PLANTATIONS, Providence, RI (US)

( * ) Notice: Subject to any disclaimer, the term of this patent is extended or adjusted under 35 U.S.C. 154(b) by 106 days.

(21) Appl. No.: 14/955,132

(22) Filed: Dec. 1, 2015

(65) Prior Publication Data

US 2017/0153387 A1 Jun. 1, 2017

(51) Int. Cl.
*G01L 1/24* (2006.01)
*G02B 6/02* (2006.01)
*G01B 11/24* (2006.01)
*G01B 11/16* (2006.01)

(52) U.S. Cl.
CPC .......... *G02B 6/0208* (2013.01); *G01B 11/161* (2013.01); *G01B 11/2441* (2013.01)

(58) Field of Classification Search
CPC ....................................................... G01L 1/24
USPC ....................................................... 356/35.5
See application file for complete search history.

(56) References Cited

U.S. PATENT DOCUMENTS

| 4,996,419 | A | * | 2/1991 | Morey | G01L 1/246 250/227.18 |
|---|---|---|---|---|---|
| 6,266,181 | B1 | * | 7/2001 | Ohishi | C03C 3/122 359/341.1 |
| 7,330,271 | B2 | * | 2/2008 | Frick | G01D 5/268 356/480 |
| 7,781,724 | B2 | * | 8/2010 | Childers | A61B 1/00165 250/227.14 |
| 9,109,968 | B2 | * | 8/2015 | Dutoit | E21B 47/0001 |
| 2004/0037505 | A1 | * | 2/2004 | Morin | G02B 6/02085 385/37 |
| 2004/0067003 | A1 | * | 4/2004 | Chliaguine | G01D 5/35303 385/13 |

(Continued)

*Primary Examiner* — Roy M Punnoose
(74) *Attorney, Agent, or Firm* — Barlow, Josephs & Holmes, Ltd.

(57) ABSTRACT

The present disclosure provides a novel fiber optic sensing device using ultra-weak, terahertz-range reflector structures. A fiber optic sensor device for distributed measurements (strain/temperature) includes an optical fiber detection arm having an inner core extending along a length of the optical fiber, an outer cladding surrounding the inner core, and at least one ultra-weak, terahertz-range reflector structure. Each reflector structure is comprised of two or more ultra-weak range reflectors (gratings) written at a spacing corresponding to the terahertz range and formed along a length of the inner core of the optical fiber. A narrow bandwidth, tunable laser interrogation system interrogates the optical fiber and measures changes in reflections and interference patterns caused by physical changes in the optical fiber.

16 Claims, 19 Drawing Sheets

(56) References Cited

U.S. PATENT DOCUMENTS

| | | | | |
|---|---|---|---|---|
| 2004/0213511 | A1* | 10/2004 | Scholz | H01S 3/063 385/27 |
| 2005/0242287 | A1* | 11/2005 | Hakimi | G01N 21/3581 250/363.09 |
| 2006/0013523 | A1* | 1/2006 | Childlers | A61B 1/00165 385/12 |
| 2008/0025680 | A1* | 1/2008 | Sun | G02B 6/02033 385/125 |
| 2008/0204706 | A1* | 8/2008 | Magne | G01M 5/0025 356/32 |
| 2009/0097809 | A1* | 4/2009 | Skorobogatiy | G02B 6/02304 385/125 |
| 2013/0114635 | A1* | 5/2013 | Kuksenkov | H01S 5/06256 372/50.11 |
| 2016/0231197 | A1* | 8/2016 | Baker | G01M 11/3172 |
| 2016/0273335 | A1* | 9/2016 | Quintero | G01V 5/101 |
| 2016/0363493 | A1* | 12/2016 | Xia | D07B 1/145 |

* cited by examiner

WEAK REFLECTION TERAHERTZ FIBER OPTIC DEVICES FOR DISTRIBUTED SENSING APPLICATIONS

STATEMENT OF GOVERNMENT INTEREST

The present invention was made with government support under Grant No. CCF1439011, awarded by the National Science Foundation. The government has certain rights in the invention.

BACKGROUND OF THE INVENTION (1) Field of the Invention

The instant invention relates to fiber optic devices for distributed sensing applications, and more particularly to a fiber optic sensing device using a series of one or more ultra-weak, terahertz-range reflectors, reflector cavities, or reflector structures to perform interferometric measurements.

(2) Description of Related Art

Waveguide-based sensing devices have increasingly demonstrated their utility in recent years, leading to their expanding adoption in areas previously dominated by more traditional sensing methodologies. This growth is due in large part to the several distinct advantages waveguide-based sensors have over other, earlier methods. These advantages include the ease with which such devices can be multiplexed and simultaneously interrogated along a single waveguide structure, thereby allowing for distributed sensing over a substantial distance with high spatial and temporal resolution.

Fabry-Perot interferometers, Bragg gratings, and other periodic reflector structures are mature sensing techniques that have been widely used for strain, stress, pressure, and temperature measurement. Through the integration of these structures into a variety of waveguides, the utility of these technologies has been successfully demonstrated over a broad set of frequency ranges. In the optics domain, incident frequencies in the hundreds of terahertz are routinely used to interrogate periodic fiber reflector structures. By resolving shifts in the reflected spectra, subtle changes in the parameters of interest can be precisely measured. Similar utility has been demonstrated in the microwave domain (several gigahertz) through the successful implementation of coaxial cable Bragg gratings (CCBGs) fabricated by introducing physical discontinuities in the cable structure at the centimeter scale.

Fiber reflector structures and CCBGs have demonstrated their utility for large scale, multiplexed sensing applications. However, these techniques have distinct limitations. For example, the large frequency ranges necessary for interrogation in the optical domain require broadband swept frequency lasers, which are very expensive, or a combination of a broadband light source and optical spectrum analyzer, with broad ranges (tens of nm, or a few terahertz, at a wavelength of around 1550 nm). In the microwave domain, the long pitch-length of coaxial cable gratings limits spatial resolution (tens of cm) for sensing applications.

SUMMARY OF THE INVENTION

The present disclosure provides a novel optical fiber sensing device using a series of one or more ultra-weak (<−50 dB), terahertz-range reflector structures as a sensing modality. Ultra-weak reflection is defined within the art as <−50 dB). These terahertz-range reflector structures require a narrower interrogation bandwidth (hundreds of gigahertz or less) than traditional optical fiber sensing modalities, such as fiber gratings, Fabry-Perot interferometers, or Raleigh backscatter based devices, and thus can utilize light sources with narrow bandwidth.

The present invention has identified terahertz frequency sensing as a promising method of surmounting the limitations faced by both the optical and microwave domains. Terahertz frequencies lie between the optical and microwave frequency ranges, which are hundreds of terahertz and tens of gigahertz, respectively. As a consequence of this unique spectral position, terahertz sensing has the potential to marry the positive qualities of both optical and microwave reflector techniques. Compared to other optical reflector structures and CCBGs, terahertz-range reflectors require a narrower interrogation bandwidth (hundreds of gigahertz or less), while retaining comparable spatial resolution.

By using heterodyne mixing, this technique has the potential to lead to simplified sensor interrogation using narrow interrogation bandwidths, increased sampling rates, accelerated signal processing speed due to the reduced data size per scan, ultralow loss and power budget for individual sensing elements, and greatly-enhanced distributed sensing capacity with high spatial resolution.

More specifically, the present disclosure provides a novel fiber optic sensing device using terahertz-range reflector structures. A fiber optic sensor device for distributed measurements such as strain and/or temperature, includes an optical fiber detection arm having an inner core extending along a length of the optical fiber, an outer cladding surrounding the inner core and extending along a length of the optical fiber, and at least one ultra-weak, terahertz-range reflector structure formed along a length of the inner core of the optical fiber. Each reflector structure comprises at least two spaced ultra-weak reflectors.

By assembling three or more described optical fiber sensor devices together in a bundle, an optical fiber shape/position sensing device is constructed which is capable of accurate three-dimensional position and shape measurement.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

DETAILED DESCRIPTION OF THE INVENTION

Figure 1:
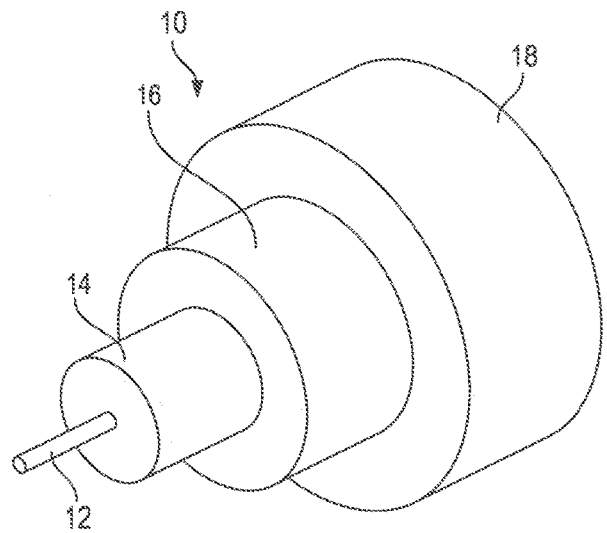
FIG. 1 is a view of an exemplary fiber optic cable construction.

Referring now to the drawings, an exemplary embodiment of an optical fiber is generally indicated at 10 in FIG. 1. The optical fiber includes an inner core 12 extending along the length of the fiber 10 and a cladding 14 surrounding the inner core 12. The optical fiber 10 may optionally include a buffer layer 16 surrounding the cladding 14, and an outer jacket 18 surrounding the buffer layer 16.

Figure 2A:
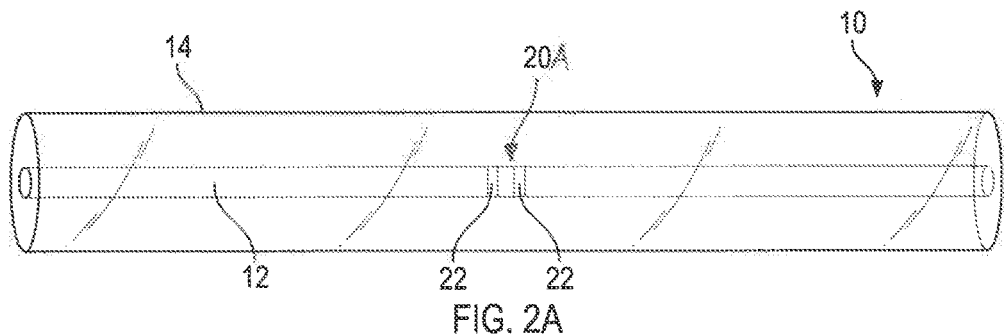
FIG. 2a is a side elevation view of the core and cladding of an optical fiber including a single ultra-weak, terahertz-range reflector cavity.
Figure 2B:
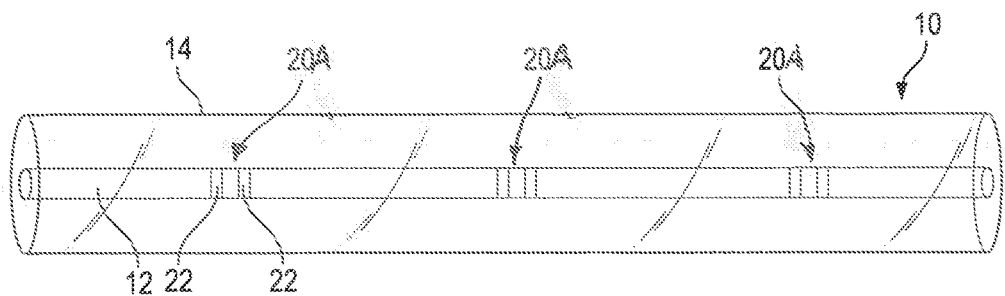
FIG. 2b is a side elevation view of the core and cladding of an optical fiber including a plurality of cascaded, equal-length, ultra-weak reflector cavities.
Figure 2C:
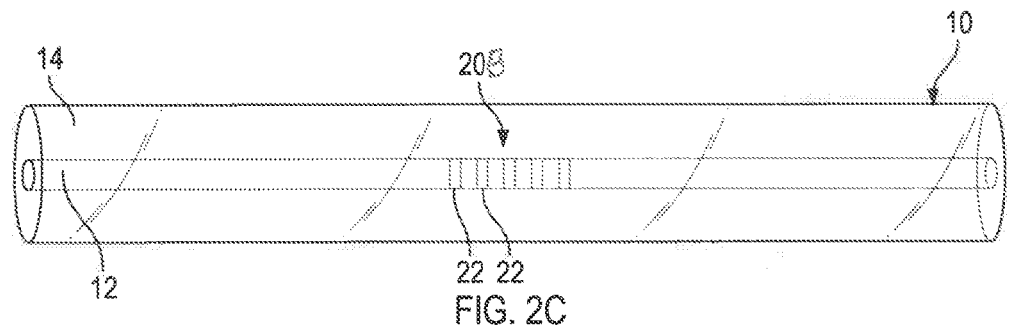
FIG. 2c is a side elevation view of the core and cladding of an optical fiber including an ultra-weak, terahertz-range reflector structure (grating)
Figure 2D:
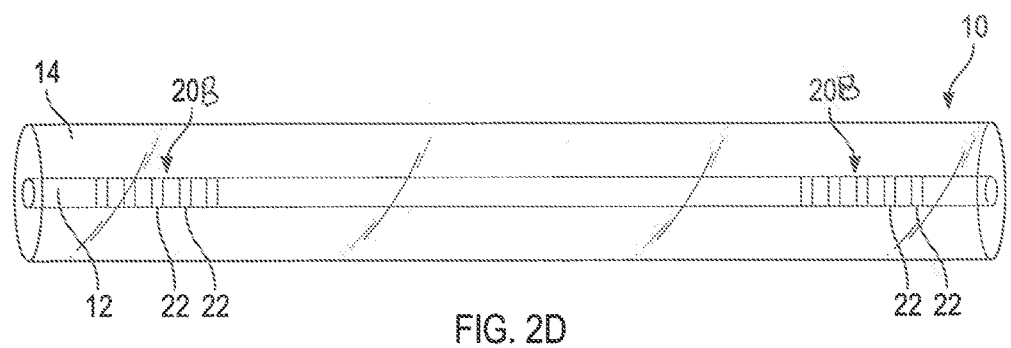
FIG. 2d is a side elevation view of the core and cladding of an optical fiber including cascaded, ultra-weak, terahertz-range gratings.
Figure 2E:
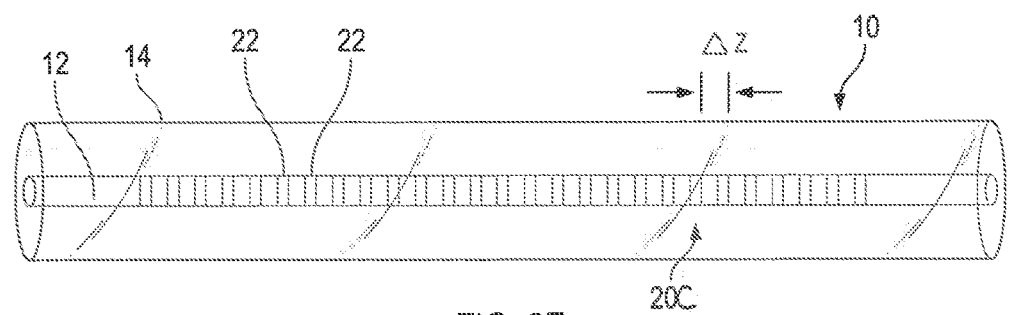
FIG. 2e is a side elevation view of the core and cladding of an optical fiber including a continuously distributed terahertz-range grating over the entire length of fiber.

Turning to FIGS. 2A-2E, the optical fiber 10 for use in distributed sensing applications includes at least one ultra-weak terahertz-range reflector structure, generally indicated at 20 (including structures 20A, 20B and 20C) formed in the fiber core 12 along a length of the fiber 10. Each of the reflector structures 20 comprises at least two ultra-weak reflectors 22 having a spacing or pitch length $\Delta z$ corresponding to the terahertz range (See FIG. 2E). Each of the reflectors 22 comprises a physical discontinuity in the core 12, which changes the refractive index of the core material. FIG. 2A shows two spaced reflectors 22 forming a reflector cavity 20A (interferometric cavity). FIG. 2B shows a plurality of spaced cavities 20A (cascaded cavities). FIG. 2C shows a plurality of spaced reflectors 22 forming a grating 20B. FIG. 2D shows a plurality of spaced gratings 20B. FIG. 2E shows a continuous grating 20C formed by a plurality of reflectors 22.

Figure 3A:
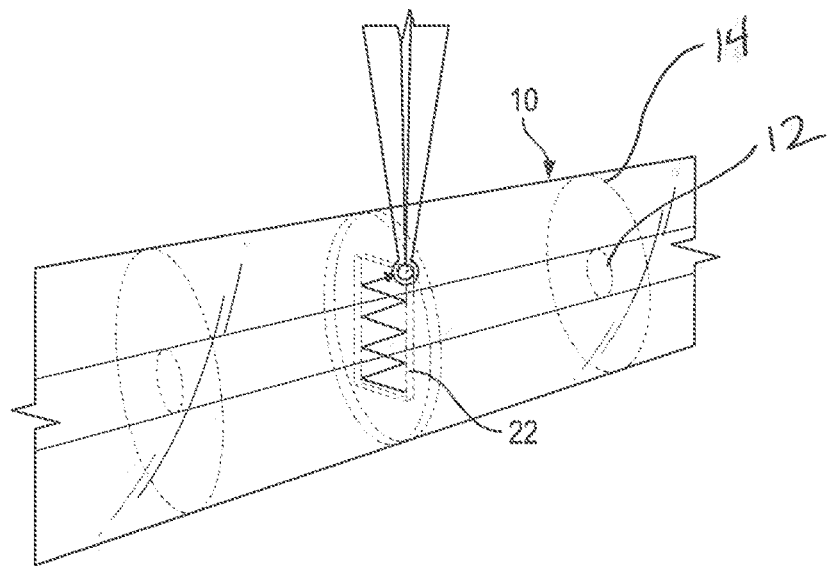
FIG. 3a shows fabrication of an ultra-weak reflector with a laser-based fabrication technique (deep UV laser, UV/NIR/IR femtosecond/picosecond laser, $CO_2$ laser)
Figure 3B:
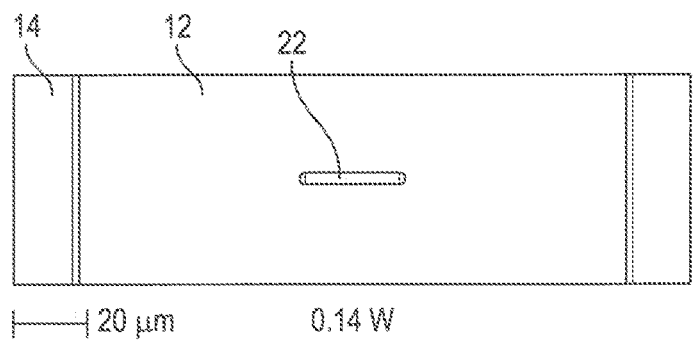
FIGS. 3b-3d show laser induced changes in the index of refraction of the fiber core with different laser power.
Figure 3C:
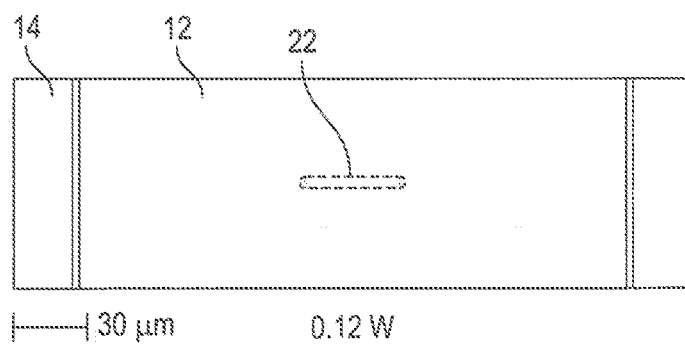
Figure 3D:
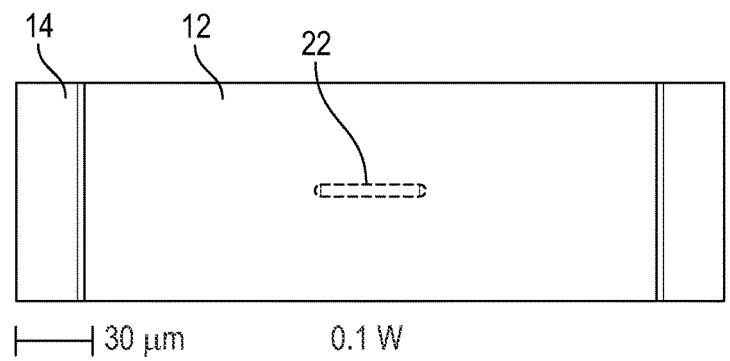
Figure 3E:
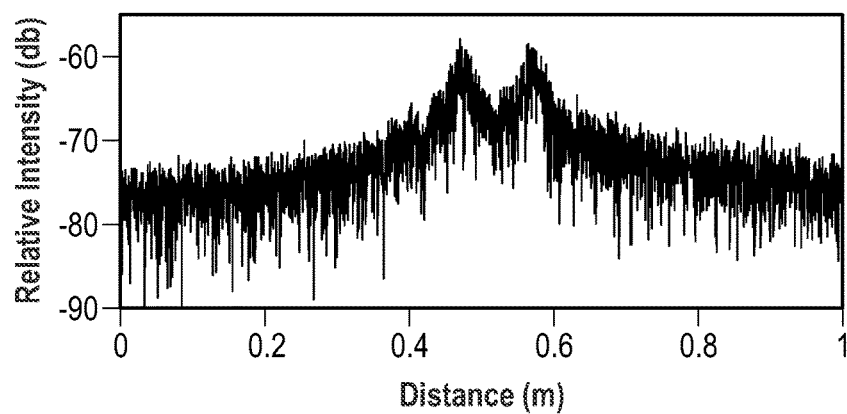
FIGS. 3e-3g show reflected intensity as a function of length of ultra-weak terahertz-range cavity, corresponding to different laser power.
Figure 3F:
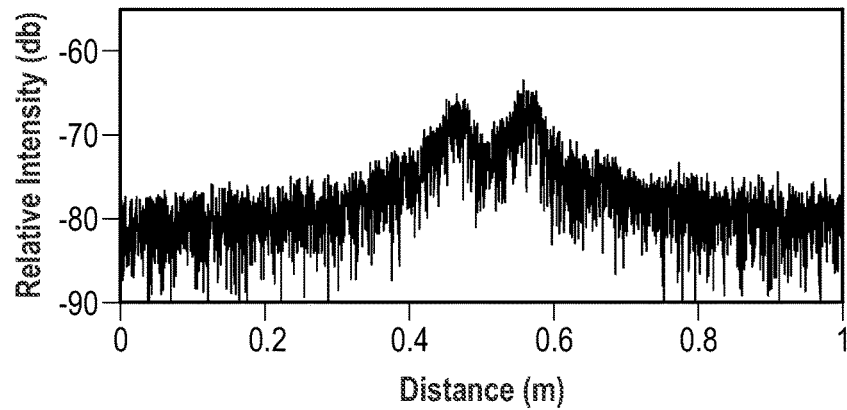
Figure 3G:
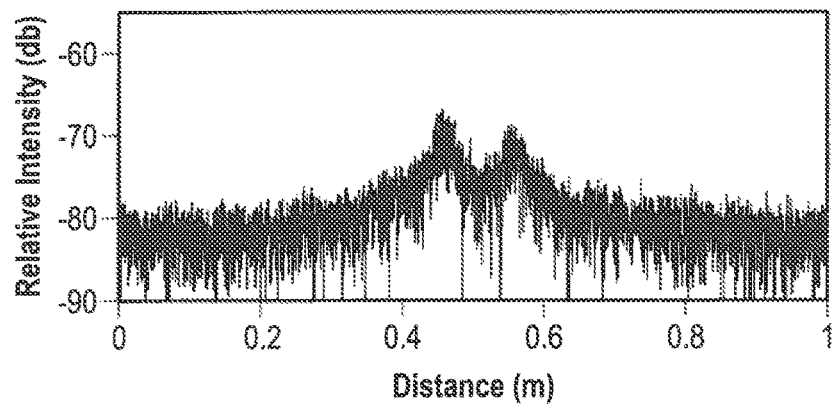

The reflector structures 22 in the illustrated embodiments are equally spaced. However, the scope of the disclosure is not limited to equally spaced terahertz-range structures, and should also be considered to include phase-shifted, period-chirped, and/or apodized grating structure;

FIG. 3A illustrates a technique used to fabricate the ultra-weak reflector 22 in accordance with the present disclosure. FIGS. 3B-3D are an enlarged photographs showing the resulting ultra-weak reflector formed within the core 12 using a femtosecond laser with laser power (0.14, 0.12, 0.1 W, respectively). FIGS. 3E-G show experimental results of the reflectivity as a function of distance of ultra-weak terahertz-range cavities corresponding to FIGS. 3B-3D, measured using an OFDR based interrogation method. It is noted that a wide variety of lasers can be utilized to fabricate the ultra-weak reflectors 22, including, but not limited to deep UV, $CO_2$, and IR/NIR femtosecond/picosecond lasers.

Figure 4:
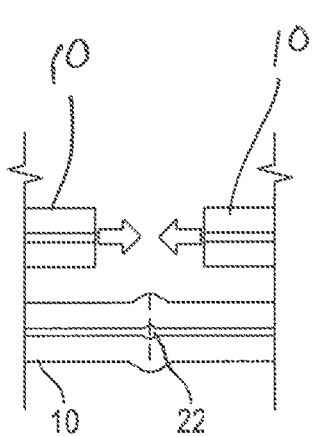
FIG. 4 shows fabrication of a ultra-weak reflector by applying extra force during splicing to create physical deformity in the fiber.
Figure 5:
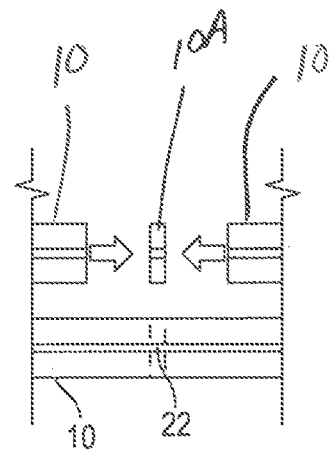
FIG. 5 shows fabrication of a ultra-weak reflector by splicing a small section of a different type of optical fiber.
Figure 6:
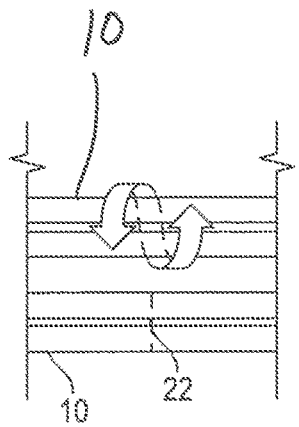
FIG. 6 shows fabrication of a ultra-weak reflector by twisting the fiber and using heat/laser to permanently set the twist.

FIGS. 4-6 show alternative methods of forming the Bragg reflectors 22, including applying force during splicing of two fibers 10 (top portion of FIG. 4) to create physical deformity in the fiber (shown in bottom portion of FIG. 4), splicing a small section 10A of a different type of optical fiber (top portion of FIG. 5) resulting in a reflector structure 22 (shown in the bottom portion of FIG. 5), and twisting the fiber 10 (shown in the top portion of FIG. 6) and using heat/laser (not shown) to permanently set the twist resulting in a reflector structure 22 (shown in the bottom portion FIG. 6).

Figure 7A:
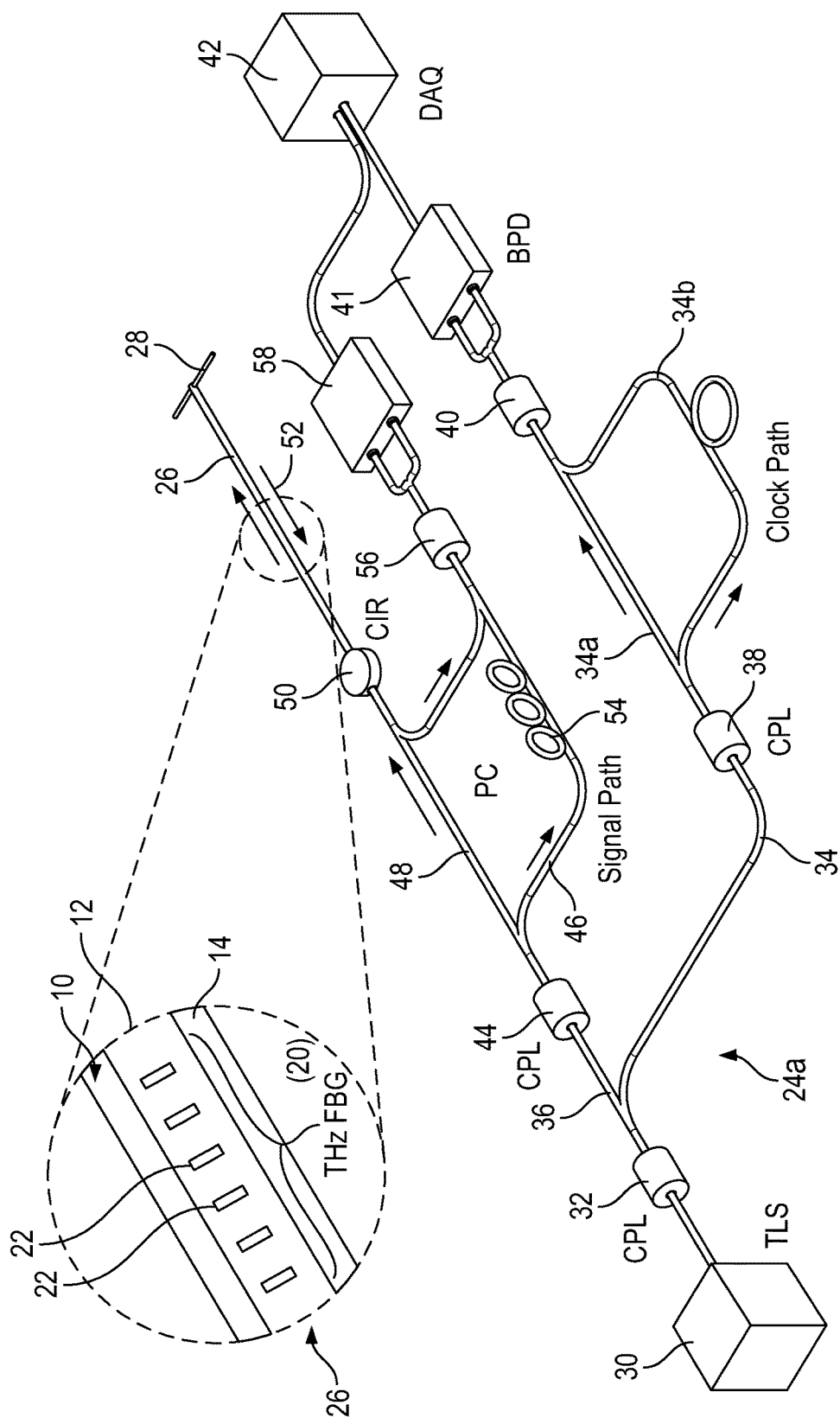
FIG. 7a is a schematic view of an exemplary sensing interrogator based on wavelength-swept optical frequency domain reflectometry.

Turning to FIG. 7A, a schematic view of an exemplary interrogation system for an optical fiber 10 is illustrated and generally indicated at 24A. The interrogation system 24A is based on optical frequency domain reflectometry (OFDR). A detection arm 26 is formed by a length of optical fiber 10 including at least one ultra-weak, terahertz-range reflector structure 20. In the illustrated embodiment, the structure 20 is a Bragg grating structure. The detection arm 26 is terminated with an anti-reflection cut 28. Light generated by a narrowband tunable laser source (NB-TLS) 30 is split by an optical coupler (CPL) 32 into two paths, "Clock" 34 and "Signal" 36. The "clock" path 34 is split into two paths of different length 34a, 34b with a first coupler 38 and recombined with another optical coupler 40, provided to a photodiode (PD) detector 41, to form an interferometer that provides the sample clock for the data acquisition card (DAQ) 42, compensating for the non-linearity of the tunable laser 30. Light in the "signal" path is split using a coupler 44 into a reference path 46 and a detection path 48 which is coupled to the detection arm 26 through a circulator (CIR) 50. Circulator 50 guides the reflected light 52 returned from the reflectors corresponding to the range 22. A polarization controller 54 is placed on the reference arm 46 to adjust the interferometer for maximum output. Another optical coupler 56 recombines the light from reference arm 46 and detection arm 48 to the photodiodes (PD) 58 and DAQ 42.

The bandwidth of the tunable laser source 30 is reduced to 40 GHz to demonstrate the practical use of a NB-TLS for sensor demodulation. The coherence length of the tunable laser 30 is around 400 m, limiting the total length of the fiber detection arm 26 to be 400 m.

Figure 7B:
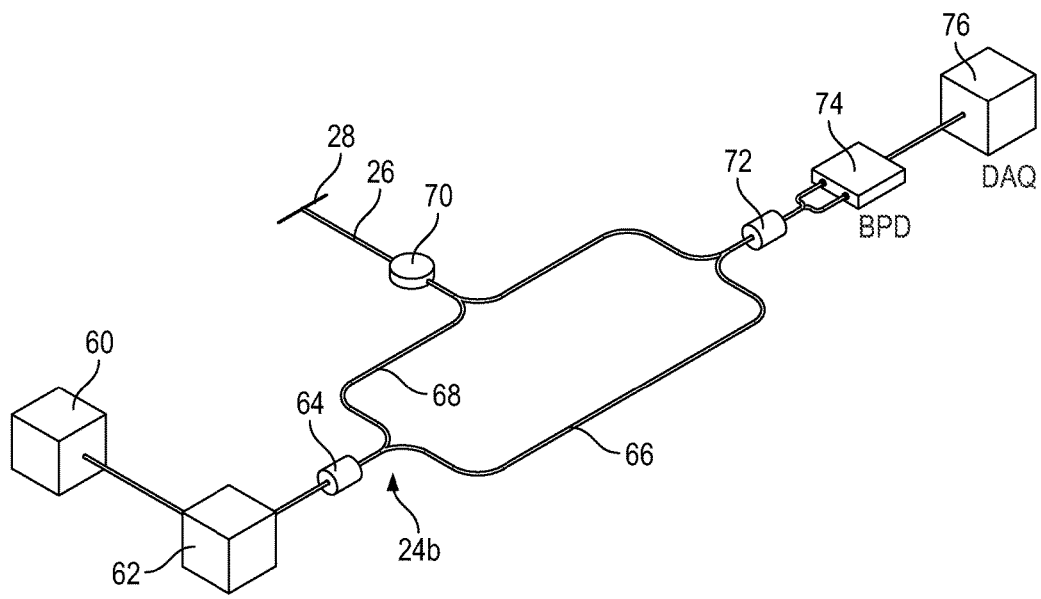
FIG. 7b is a schematic view of an exemplary sensing interrogator based on RF-modulated optical frequency domain reflectometry using optical local oscillator.
Figure 7C:
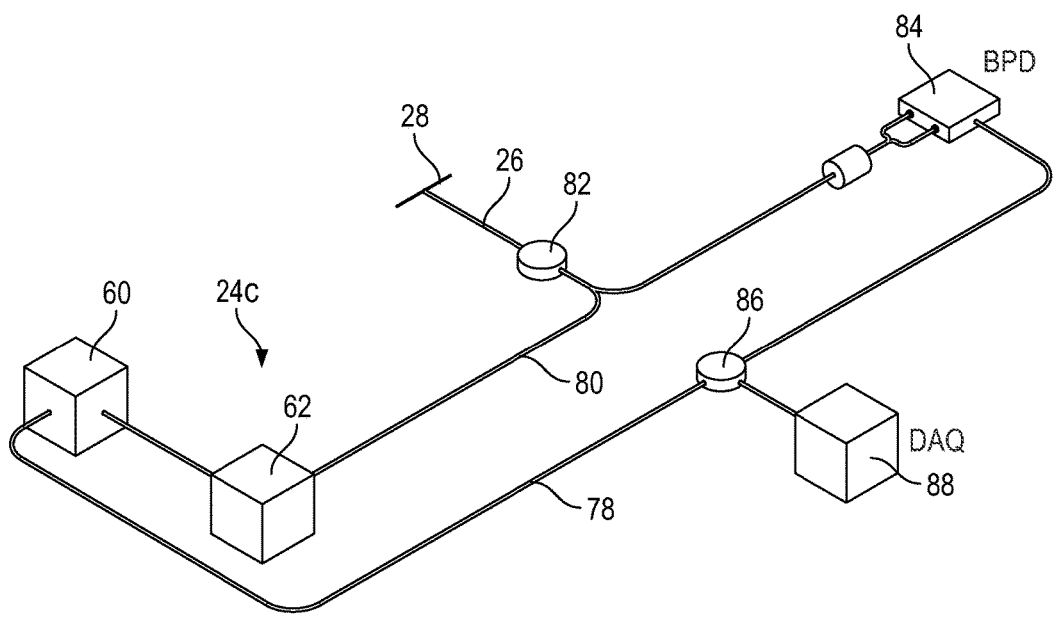
FIG. 7c is a schematic view of an exemplary sensing interrogator based on RF-modulated optical frequency domain reflectometry using RF local oscillator.
Figure 7D:
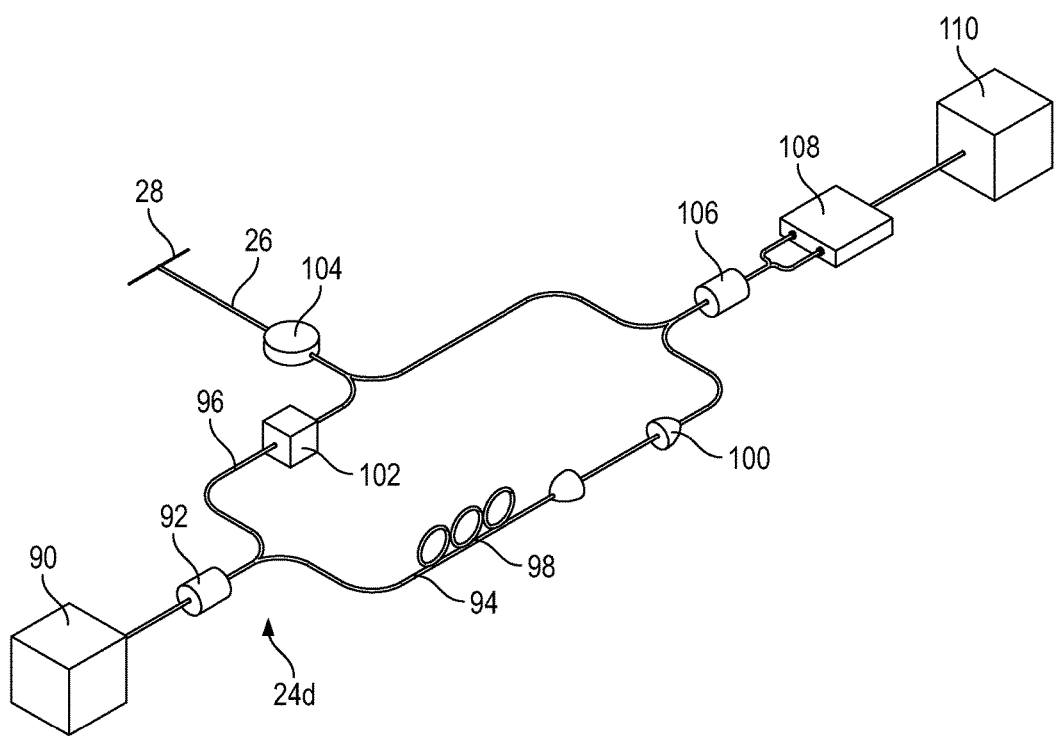
FIG. 7d is a schematic view of an exemplary sensing interrogator based on optical low-coherence reflectometry.

Other interrogation modes are also contemplated. FIG. 7B is a schematic view of an exemplary interrogation system 24B based on RF-modulated optical frequency domain reflectometry using an optical local isolator. Interrogation system 24B includes a radio frequency synthesizer 60, a modulated broadband optical source 62, a coupler 64 dividing the source path into a reference path 66 and a signal path 68. Reflected light in the signal path 68 is returned by way of circulator 70 where it is recombined with another coupler 72 to the photodiode 74 and DAQ 76. FIG. 7C is a schematic view of an exemplary interrogation system 24C based on RF-modulated optical frequency domain reflectometry using an RF local isolator. Interrogation system 24C includes a radio frequency synthesizer 60, and a modulated broadband optical source 62. A reference path 78 extends directly from the radio frequency synthesizer 60. Reflected light in the signal path 80 is returned by way of circulator 82 where it is sent to the photodiode 84. The signal from the PD 84 is mixed (86) with the reference path 78 and then sent to the DAQ 88. FIG. 7D is a schematic view of an exemplary interrogation system 24D based on optical low coherence reflectometry. Interrogation system 24D includes a broadband optical source 90, a coupler 92 dividing the source path into a reference path 94 and a signal path 96. The reference path 94 includes a polarization controller 98 and a tunable optical delay 100. The signal path 96 includes an attenuator 102. Reflected light in the signal path 96 is returned by way of circulator 104 where it is recombined with the reference path 94 through another coupler 106 and then to the photodiode 108 and DAQ 110.

The utility of ultra-weak terahertz-range reflector structures 20 as a temperature sensing modality is described below in connection with FIGS. 8 and 9.

Figure 8A:
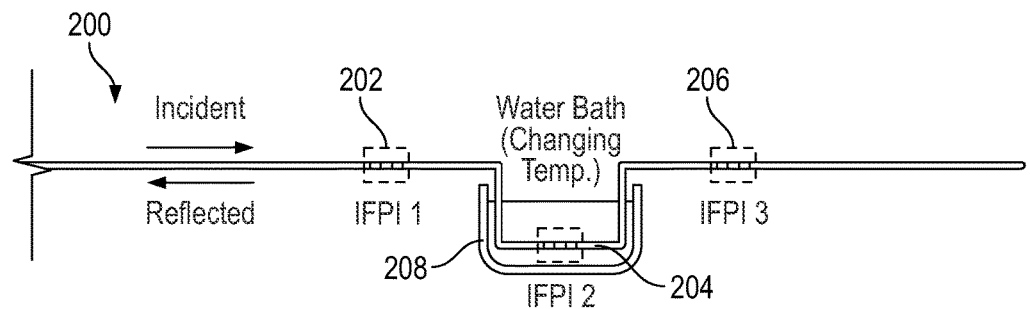
FIG. 8a shows a schematic of ultra-weak, terahertz-range distributed temperature sensing testing, where the second of three series IFPI cavities is subjected to changing temperatures in a water bath.
Figure 8B:
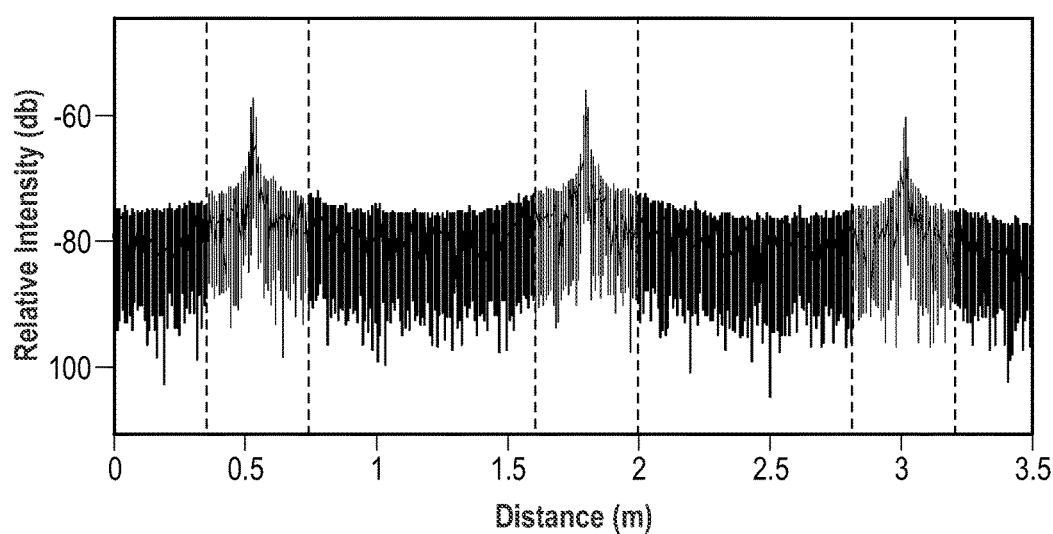
FIG. 8b shows reflectivity as a function of distance along the ultra-weak terahertz-range cavity under test.
Figure 8C:
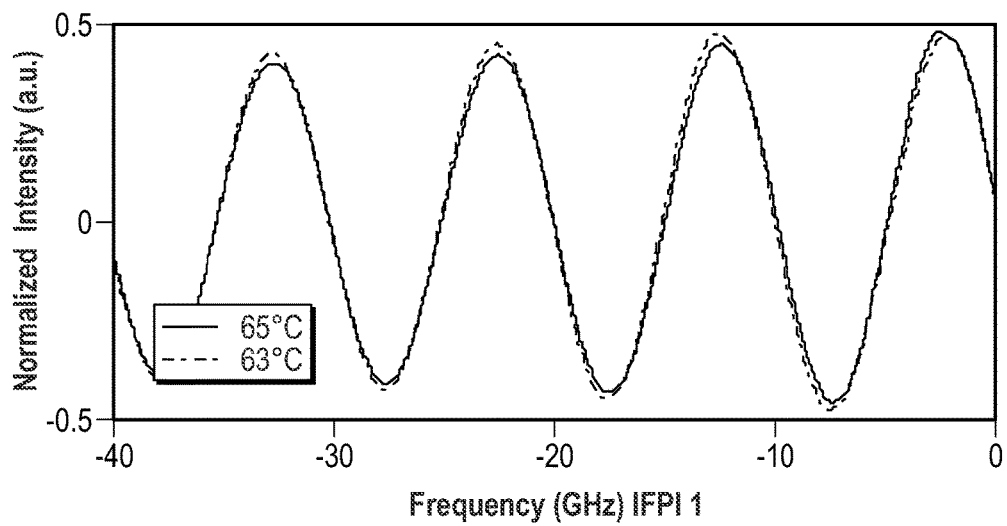
FIGS. 8c-8e show the resulting interference patterns from each discrete sensing cavity (IFPI) as temperature is changed at the second ultra-weak terahertz-range cavity (IFPI)
Figure 8D:
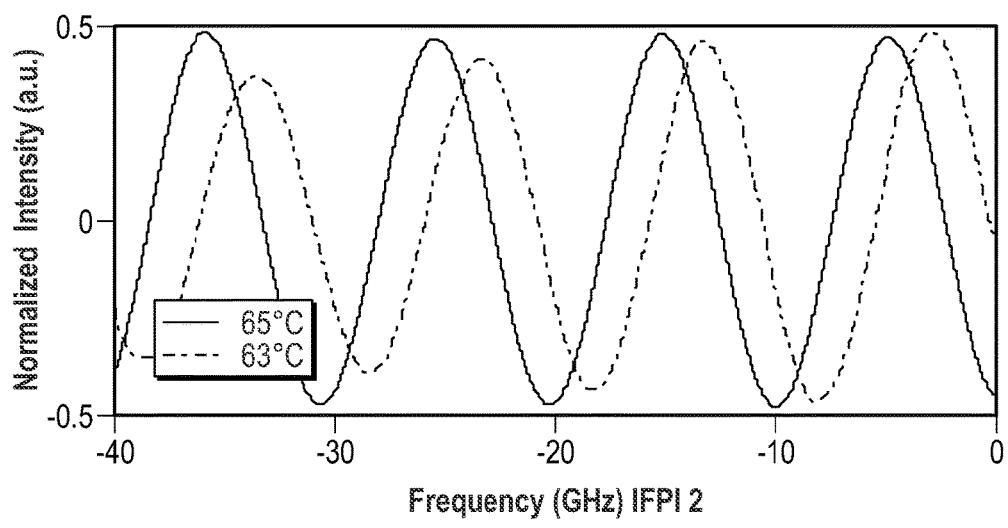
Figure 8E:
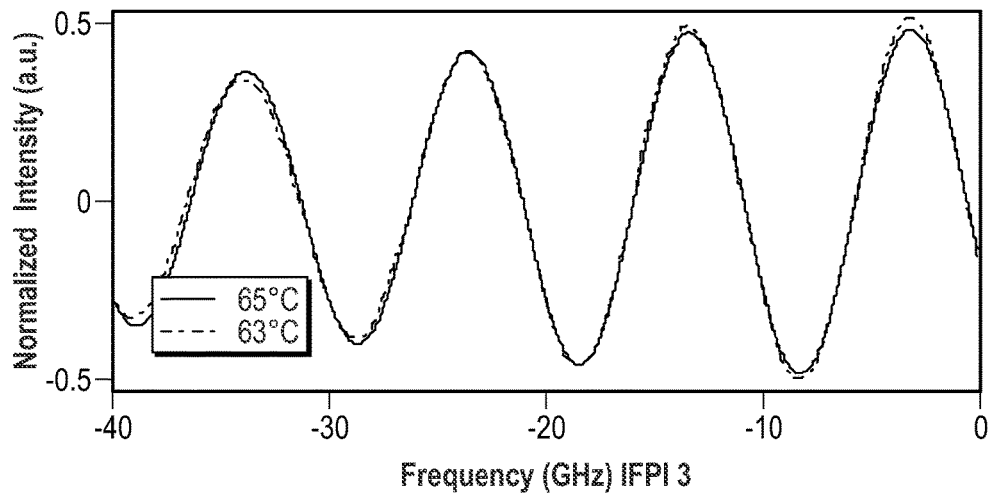

Turning to FIG. 8A, an ultra-weak, terahertz-range distributed temperature sensing system 200 includes three intrinsic Fabry Perot interferometric (IFPI) cavities 202, 204, 206, where the second 204 of three series IFPI cavities is subjected to changing temperatures in a water bath 208. FIG. 8B shows reflectivity as a function of distance along the ultra-weak terahertz-range cavity under test. FIGS. 8C-8E show the resulting interference patterns from each discrete sensing cavity (IFPI) as temperature is changed at the second ultra-weak terahertz-range cavity (IFPI). Cavity 204 in the water bath shows a significant change in FIG. 8D.

Figure 9A:
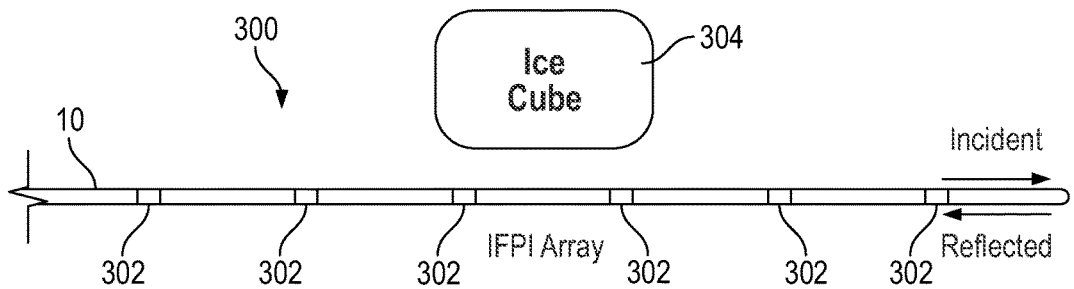
FIG. 9a shows a schematic of temperature sensing along a continuously cascaded IFPI sensing array.
Figure 9B:
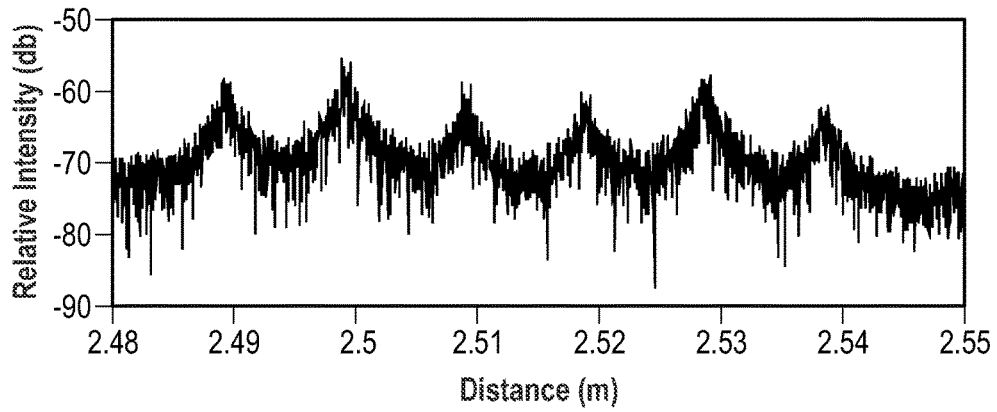
FIG. 9b shows reflectivity as a function of distance along the IFPI array under test.
Figure 9C:
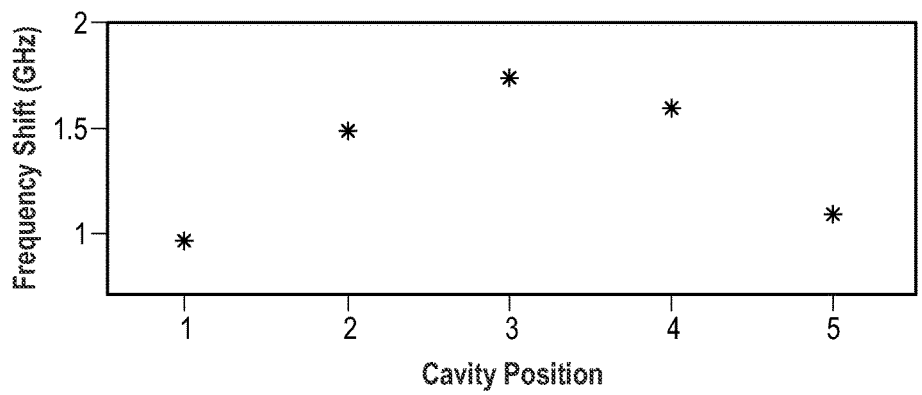
FIG. 9c shows resulting temperature shift detected using each discrete cavity (IFPI)

FIG. 9A shows a temperature sensing system 300 including an array of cascaded IFPI cavities 302 in a fiber 10. An ice cube 304 is located in proximity to the center of the array. FIG. 9b shows reflectivity at each cavity as a function of distance along the IFPI array under test. FIG. 9c shows a resulting temperature shift detected near the center of the array using each discrete cavity (IFPI).

Figure 10A:
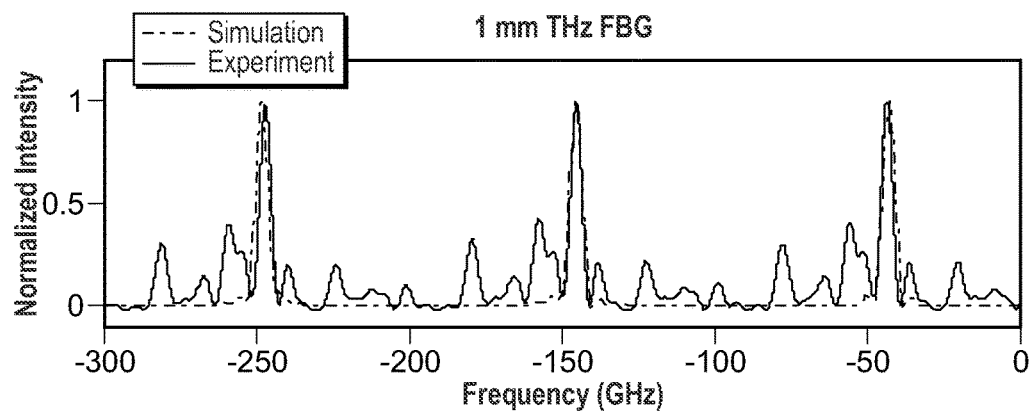
FIGS. 10A and 10B are graphical depictions of simulated and experimental results of ultra-weak terahertz-range equally spaced structures (gratings) (Bragg gratings): (a) 1 mm period, 20 reflector points, 0.11 W; and (b) 0.1 mm period, 20 reflector points. 0.11 W.
Figure 10B:
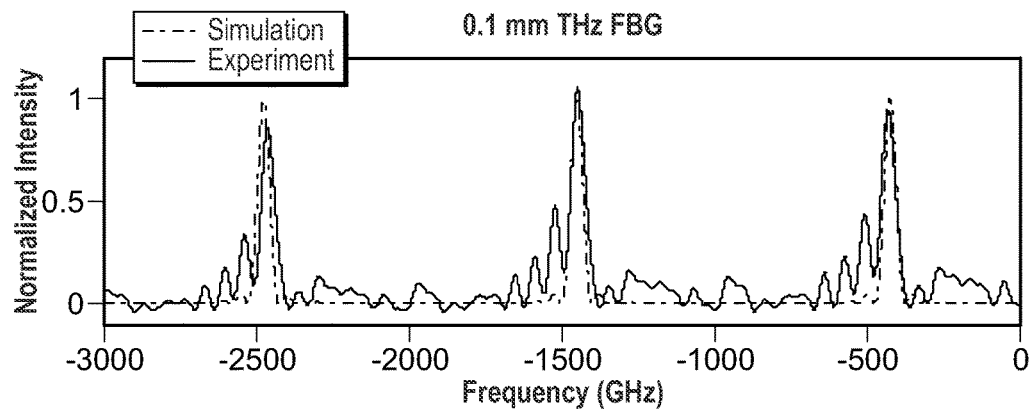

FIGS. 10A and 10B are graphical depictions of simulated (dashed line) and experimental (solid line) results of ultra-weak terahertz-range equally spaced structures (gratings) (Bragg gratings): (a) 1 mm period, 20 reflector points, 0.11 W; and (b) 0.1 mm period, 20 reflector points, 0.11 W;

In order to determine the effect of varying the number reflection points on signal quality, the full width at half maximum (FWHM) of signals from gratings with differing numbers of reflectors were measured. Three ultra-weak terahertz-range gratings were fabricated using the same period (1 mm) and same fabrication power (0.11 W), and with 10, 20, and 40 reflection points, respectively. Data were sampled 100 times from each ultra-weak terahertz-range grating. The average FWHM results for the 10, 20, and 40 reflection point ultra-weak terahertz-range gratings were 7.03 GHz, 3.85 GHz, and 1.27 GHz, respectively. These results indicate that, when period and fabrication power are held constant, increasing the number of reflection points of a ultra-weak terahertz-range grating results in enhanced signal quality factor (Q-factor). However, the trade-off is the mitigated spatial resolution due to the increased gratng length.

Figure 11A:
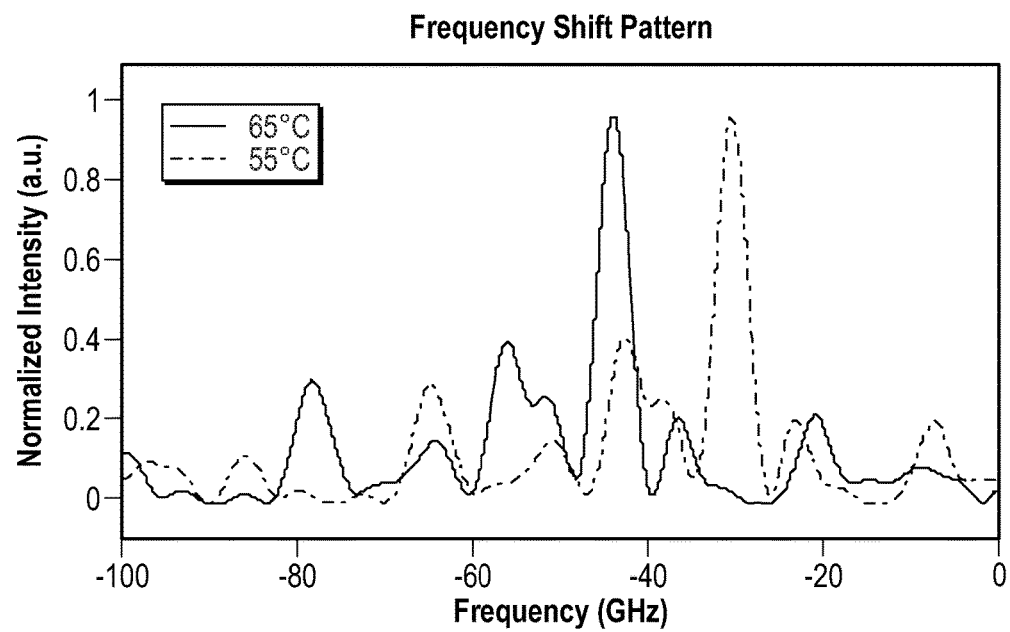
FIGS. 11A-11C are graphical illustrations of temperature response in a distributed temperature sensing environment where (a) 1 mm ultra-weak terahertz-range equally spaced grating showing spectra at 65° C. and 55° C., (b) cross-correlation pattern to extract the frequency shift from (a), and (c) frequency shift as a function of temperature.
Figure 11B:
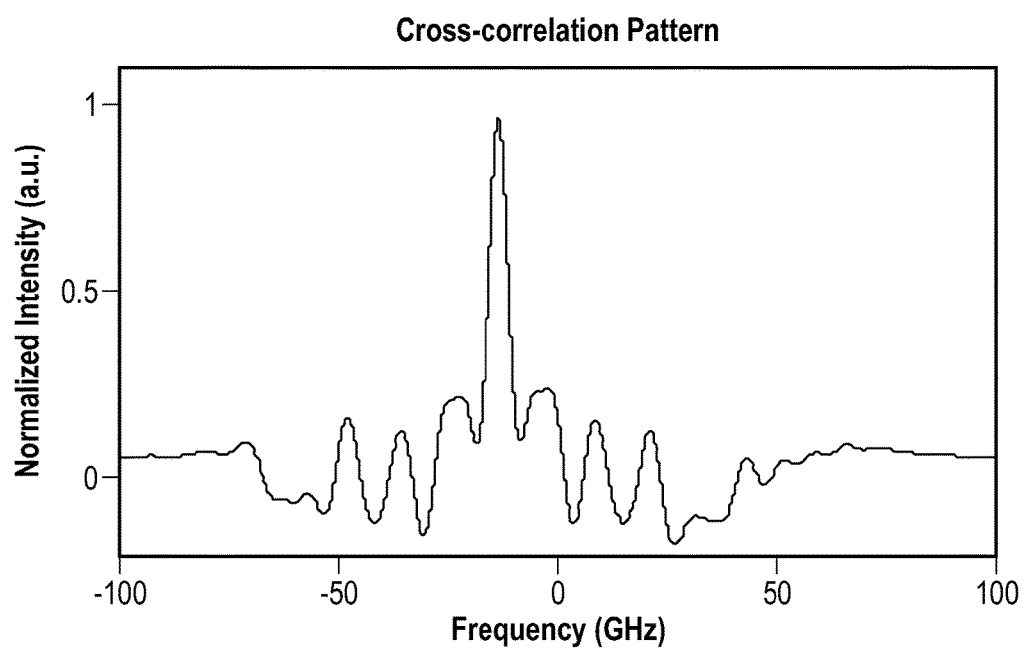
Figure 11C:
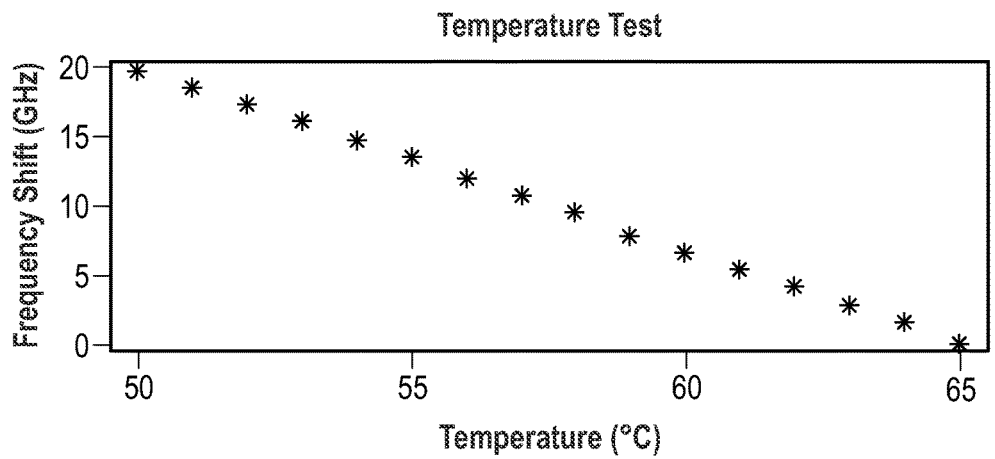

The utility of an ultra-weak terahertz-range grating as a temperature sensor is described below in connection with FIGS. 11A-11C. An ultra-weak terahertz-range grating was fabricated using a femtosecond laser power of 0.11 W, a period length of 1 mm, and 20 reflection points. The ultra-weak terahertz-range grating was placed in a temperature-controlled water bath and the sensor's temperature response measured. FIG. 11A shows the frequency signal at both 55° C. and 65° C. As the temperature increases, the period of grating increases, causing a corresponding shift in resonant frequency. The frequency shift is extracted by calculating the cross correlation pattern. FIG. 11B shows the normalized cross-correlation pattern from FIG. 11A with a frequency shift of 12.84 GHz. FIG. 11C plots the temperature response from 50° C. to 65° C. Using this configuration, the temperature sensitivity for the ultra-weak terahertz-range grating was observed to be approximately −1.32

GHz/° C. It is worth noting that the sensitivity of ultra-weak terahertz-range grating is much larger than conventional microwave grating due to the fact that the interrogation window in the proposed setup is in optical range, and the grating resonant peak under test is at a much higher order in comparison with $1^{st}$ order in a microwave grating. For 1 mm grating, the resonant peaks range from $1923^{th}$ to $1967^{th}$ order, given that the laser tuning bandwidth is from 1525 to 1555 nm.

Figure 12A:
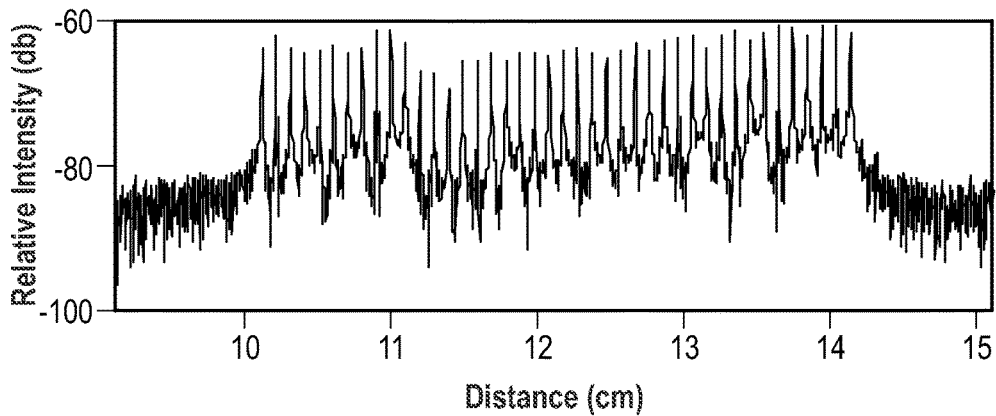
FIGS. 12A and 12B show a graphical illustrations of distributed sensing tests with a ultra-weak terahertz-range equally spaced gratings (a) a time domain 40 reflection point ultra-weak terahertz-range equally spaced grating signal and (b) frequency shift distribution measured using ultra-weak terahertz-range equally spaced grating array
Figure 12B:
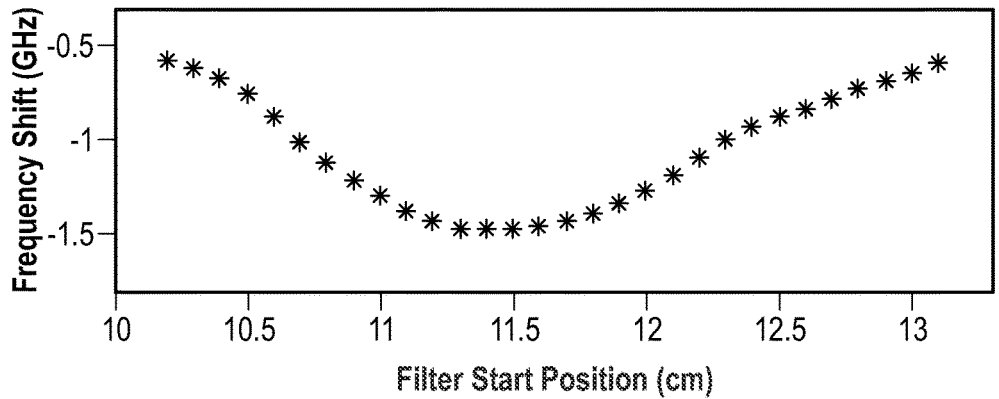

The utility of the ultra-weak terahertz-range grating array as a distributed sensor system is described in connection with FIGS. 12A and 12B. A continuously distributed ultra-weak terahertz-range grating array (with 40 reflectors) was fabricated with a period of 1 mm, shown in FIG. 12A. The reflectivity of each point (reflector) is around −70 dB. The reflectivity of each reflection point varies due to imperfections in the fabrication process. The reflection spectra of the ultra-weak terahertz-range grating were first measured with no temperature change as reference. An ice cube was then placed ~1 cm away from the ultra-weak terahertz-range grating close to center in order to introduce a temperature distribution along the sensor array. The spectra were again taken and a high order 0.1 ns time-domain moving filter, corresponding to 1 cm in spatial domain, was used to gate the grating signal with a step of 1 mm. 90% of the filter window was overlapped with its neighboring filter window. The frequency shift as a function of filter start position was plotted in FIG. 12B. A Gaussian-like temperature distribution was observed in which the center portion of the ultra-weak terahertz-range grating array experienced a frequency shift corresponding to a temperature approximately 1° C. lower than that of either edge of the ultra-weak terahertz-range grating array. This data demonstrates that ultra-weak terahertz-range gratings hold the potential for continuous distributed sensing with high spatial resolution. In addition, the ultra-weak reflection nature of these fabricated ultra-weak terahertz-range reflector structures promises a huge multiplexing capacity.

Figure 13A:
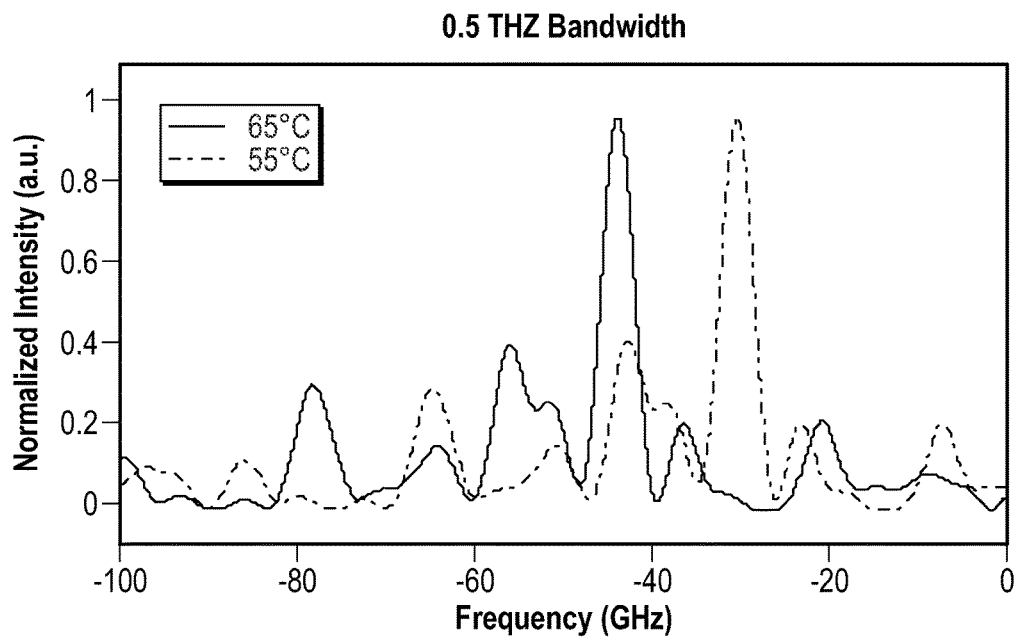
FIGS. 13A-13D show graphical illustrations of temperature response of a 1 mm ultra-weak terahertz-range grating using different laser sweeping ranges (a)-(c) temperature response with 3 different interrogation bandwidths and (d) mapped temperature testing with the 3 different interrogation bandwidths.
Figure 13B:
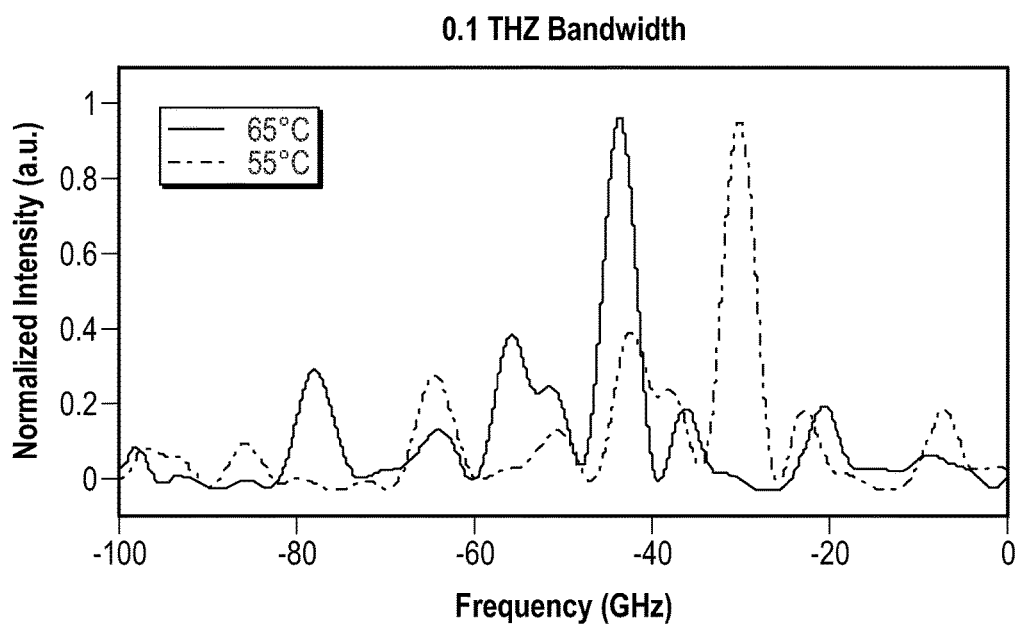
Figure 13C:
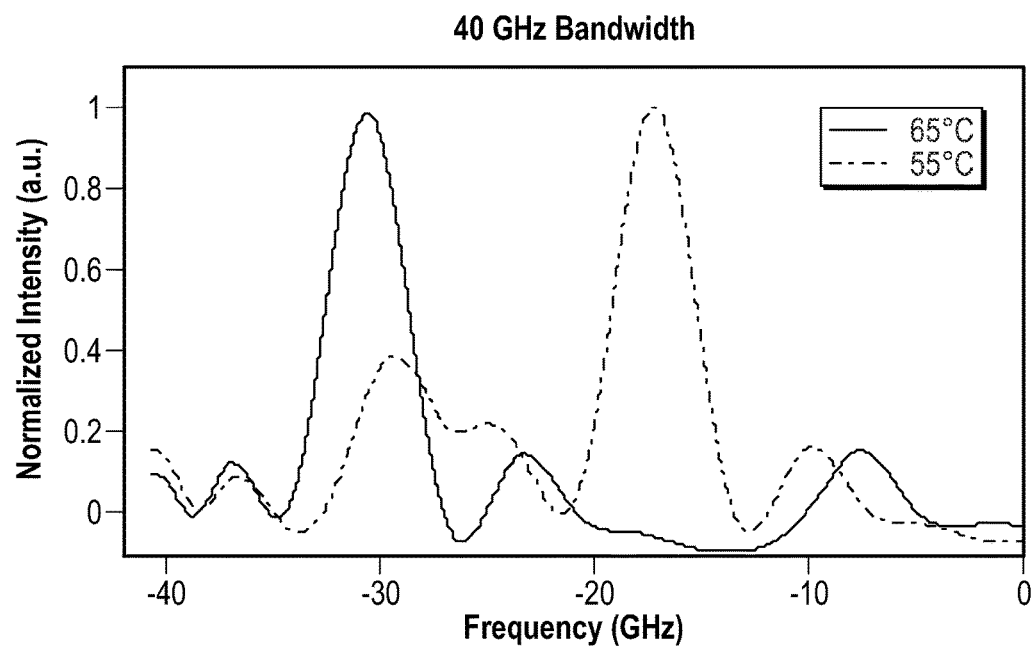
Figure 13D:
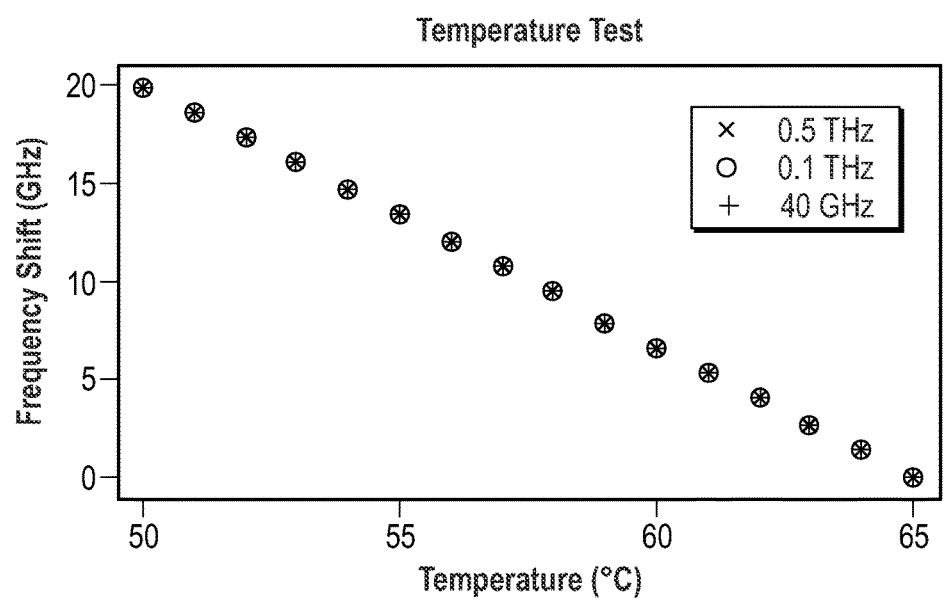

A key feature of ultra-weak terahertz-range devices is that they require a much narrower detection bandwidth than conventional FBGs, interferometer, or Rayleigh backscatter based method in the optical frequency range while maintaining good spatial resolution. To demonstrate this feature, an ultra-weak terahertz-range grating with 20 reflection points was tested using differing sweeping bandwidths from a tunable laser. FIGS. 13A-C show the spectra of the sensor under test using these differing laser sweep bandwidths. FIG. 14D shows the temperature response for each different bandwidth, which are observed to agree well with each other. These results demonstrate that use of an ultra-weak terahertz-range device can effectively reduce detection bandwidth.

To evaluate system-level accuracy, a stability test was conducted by fixing the temperature of a 1 mm, 20 reflection point ultra-weak terahertz-range grating. 100 spectra were recorded using this configuration. The frequency shift of each spectrum relative to its initial status was calculated. The standard deviation of the frequency shift was less than 2.27 MHz. Given the experimentally measured sensitivity of −1.32 GHz/° C., its temperature detection limit is calculated to be less than 0.0017° C. This demonstrates that ultra-weak Terahertz-range grating holds significant potential for high-accuracy detection.

Exemplary Devices

Figure 14A:
FIG. 14A is a schematic view of an exemplary optical fiber sensing device including an ultra-weak terahertz-range reflector cavity.
Figure 14B:
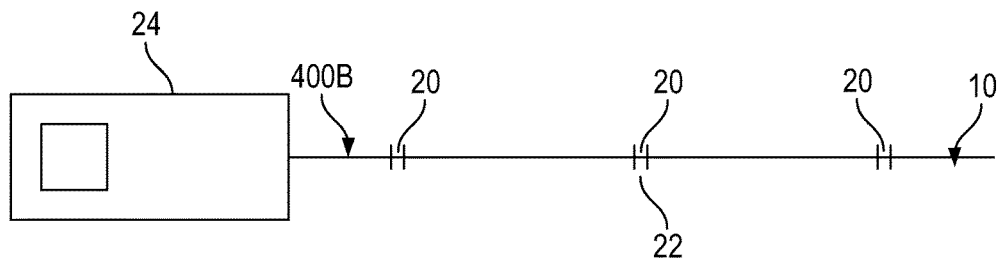
FIG. 14B is a schematic view of an exemplary optical fiber sensing device including a plurality of cascaded ultra-weak terahertz-range cavities.
Figure 14C:
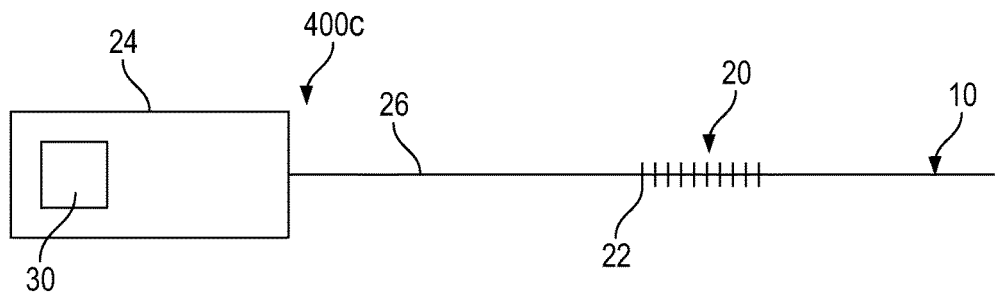
FIG. 14C is a schematic view of an exemplary optical fiber sensing device including an ultra-weak Terahertz-range grating structure.
Figure 14D:
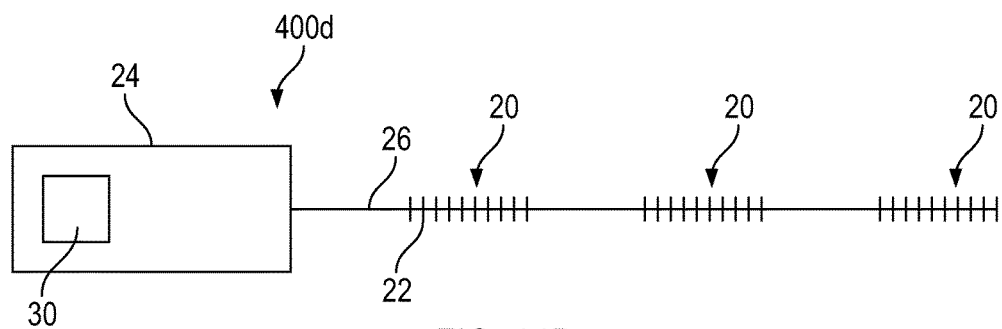
FIG. 14d is a schematic view of an exemplary optical fiber sensing device including a plurality of cascaded ultra-weak terahertz-range grating structures.

Turning now to FIGS. 14A-E, a fiber optic distributed sensing device 400 for distributed measurement, in accordance with the present invention, comprises a detection arm 26 formed from an optical fiber 10 including an inner core 12 extending along a length of the optical fiber, an outer cladding 14 surrounding the core 12 and extending along a length of the coaxial cable and at least one ultra-weak terahertz-range reflector structure 20 (cavity/grating). As described above, an ultra-weak terahertz-range cavity 20 is formed from two spaced ultra-weak reflectors 22 with a spacing in the terahertz range (FIG. 14A). In order to provide a distributed strain or temperature profile for the entire optical fiber detection arm 26, the ultra-weak terahertz-range cavities 20 may be repeated N times along the entire length of the fiber 10 (see FIG. 14B).

Figure 14E:
FIG. 14e is a schematic view of an exemplary optical fiber sensing device including a continuous ultra-weak terahertz-range grating structure.

Turning to FIG. 14C, the ultra-weak terahertz-range reflector structure 20 is a grating structure formed from a plurality of spaced, ultra-weak terahertz-range reflectors 22. In order to provide a distributed strain or temperature profile for the entire optical fiber detection arm 26, the ultra-weak terahertz-range gratings 20 may be repeated N times along the entire length of the fiber 10 (See FIG. 14D). Alternatively, a continuous ultra-weak terahertz-range grating 20 may be formed by fabricating a plurality of spaced ultra-weak terahertz-range reflectors 22 along the entire length of the fiber 10 (FIG. 14E).

In operation, the detection arm 26 is interrogated by an interrogation system 24 (as described herein) configured to interrogate the ultra-weak terahertz-range reflector structures (FIGS. 14A-E), to measure reflective changes at each of the locations and to provide a strain or temperature profile for the entire optical fiber 10. As known in the art, by shifting the ultra-weak terahertz-range device function in time domain, different ultra-weak terahertz-range reflector structures 20 can be interrogated individually, allowing a plurality of ultra-weak terahertz-range devices to be multiplexed along the entire length of the fiber 10.

Figure 15:
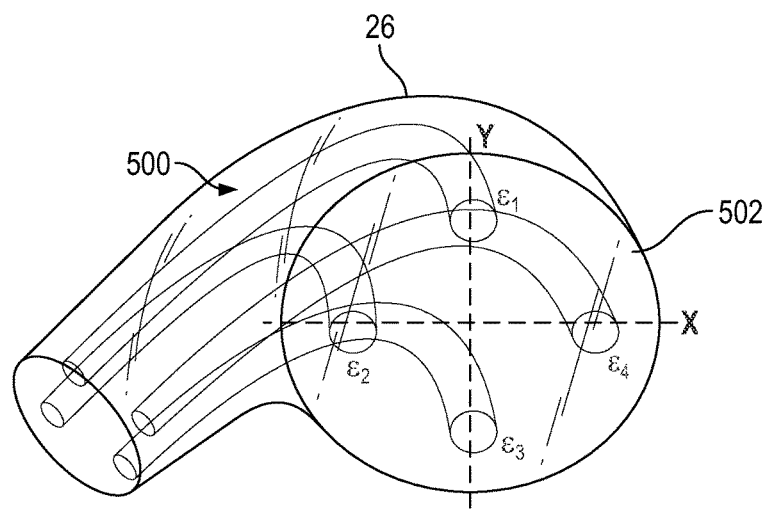
FIG. 15 is a pictorial cross-section of an exemplary optical fiber shape sensing device using a multi-core fiber.
Figure 16:
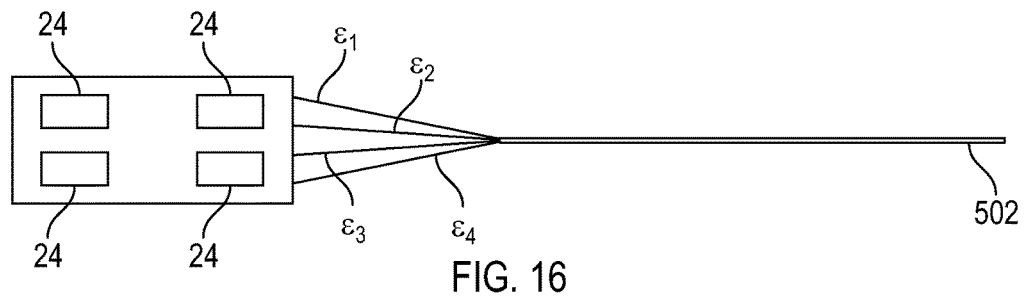
FIG. 16 is a schematic view of an exemplary optical fiber shape sensing device of FIG. 15.

Turning now to FIGS. 15-16, an optical fiber shape/position sensor device is illustrated and generally indicated at 500. As described above, a continuously distributed detection arm 26 is effective to measure the strain profile over the entire length of the fiber 10. This can be either a detection arm 26 with a plurality of ultra-weak terahertz-range gratings structures 20 spaced along the length of the optical fiber core 12 (FIG. 14B or 14D), or a continuous ultra-weak terahertz-range reflector structure (FIG. 14E). By using a multi-core fiber 502 having four cores ($\epsilon_1$, $\epsilon_2$, $\epsilon_3$, $\epsilon_4$—FIG. 15), each with their own continuous ultra-weak terahertz range grating, an optical fiber shape sensor 500 is created which is capable of accurate three-dimensional (3D) position measurement. Each strain sensor core $\epsilon_1$, $\epsilon_2$, $\epsilon_3$, $\epsilon_4$ requires its own interrogation device 24.

Shape change along the multi-core optical fiber 502 results in differing strain changes, known as directional strain change, along each of the plurality of optical fiber cores $\epsilon_1$, $\epsilon_2$, $\epsilon_3$, $\epsilon_4$ (each individual detection arm 26). The exemplary embodiment shows four (4) cores in a single fiber. However, the number of cores n may be varied. Computer modeling for receiving the distributed strain data from the multiple fibers and converting that data into corresponding shape profiles is well known in the art.

Figure 17:
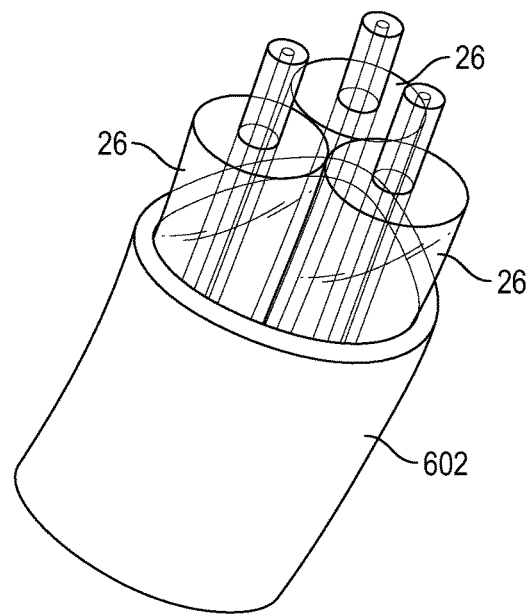
FIG. 17 is a pictorial cross-section of an exemplary optical fiber shape and position measurement device using three individual optical fibers.
Figure 18:
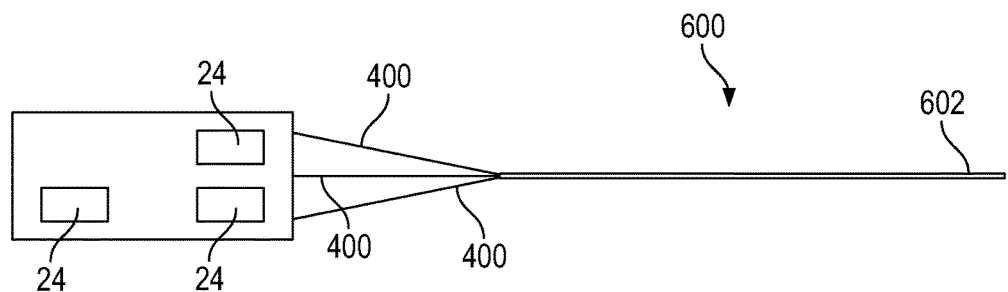
FIG. 18 is a schematic view of the exemplary optical fiber shape-sensing device of FIG. 17.

Turning to FIGS. 17 and 18, by assembling three (3) fiber strain sensors 400 together in a bundle 602, an optical fiber shape sensor 600 is created which is capable of accurate three-dimensional (3D) position measurement. Each strain sensor 400 requires its own interrogation device 24. Shape change along an optical fiber shape sensor bundle 602 results in differing strain changes, known as directional strain change, along each of the plurality of optical fiber sensors 400 (each detection arm 26). The exemplary embodiment shows three (3) separate fibers 26 in a single bundle 602. However, the number of fibers n may be varied.

It can therefore be seen that the exemplary embodiments provide a unique and novel advancement, which has substantial potential as a series of low-cost and high-performance distributed sensor systems.

While there is shown and described herein certain specific structures embodying various embodiments of the invention, it will be manifest to those skilled in the art that various modifications and rearrangements of the parts may be made without departing from the spirit and scope of the underlying inventive concept, and that the same is not limited to the particular forms herein shown and described except insofar as indicated by the scope of the appended claims.

What is claimed is:

1. An optical fiber detection arm for distributed sensing of stress, strain and temperature, comprising:
    an inner core extending along a length of the optical fiber detection arm;
    an outer cladding surrounding the inner core and extending along a length of the optical fiber detection arm, and
    at least one reflector structure formed within said inner core,
    said reflector structure comprising first and second spectral reflectors having a terahertz range pitch spacing ($\Delta z$) between about 10 terahertz and 100 gigahertz,
    each of said spectral reflectors having an ultra-weak spectral reflection of <−50 dB.

2. The optical fiber detection arm of claim 1 wherein said at least one reflector structure comprises a grating formed by a plurality of spectral reflectors.

3. The optical fiber of claim 2 wherein said grating comprises a continuous grating written along an entire length of said optical fiber.

4. The optical fiber of claim 2 comprising a plurality of spaced gratings.

5. A fiber optic sensor device for distributed measurements of stress, strain and temperature, comprising:
    an optical fiber detection arm comprising an inner core extending along a length of the optical fiber detection arm, an outer cladding surrounding the inner core and extending along a length of the optical fiber detection arm, and at least one reflector structure formed within said inner core,
    said reflector structure comprising first and second spectral reflectors having a terahertz range pitch spacing ($\Delta z$) between about 10 terahertz and 100 gigahertz,
    each of said spectral reflectors having an ultra-weak spectral reflection of <−50 dB
    said optical fiber detection arm terminated with an anti-reflection cut; and
    a narrow bandwidth interrogation system coupled to said optical fiber,
    said interrogation system comprising a narrowband tunable laser source having a tunable bandwidth of 100 gigahertz or less,
    said interrogation system interrogating said optical fiber detection arm to detect changes in reflections and interference patterns caused by physical changes in said optical fiber.

6. The fiber optic sensor device of claim 5 wherein said at least one reflector structure comprises a grating formed by a plurality of spectral reflectors.

7. The fiber optic sensor device of claim 6 wherein said grating comprises a continuous grating written along an entire length of said optical fiber.

8. The fiber optic sensor device of claim 6 wherein said detection arm includes a plurality of spaced gratings.

9. The fiber optic sensor device of claim 5 wherein said interrogation system individually interrogates each of said reflector structures.

10. A fiber optic shape/position sensing device based on ultra-weak, terahertz-range reflector structures comprising:
    a plurality of fiber optic sensor devices extending in parallel, adjacent relation to form a shape-sensing bundle,
    each of said fiber optic sensor devices comprising an optical fiber detection arm an inner core extending along a length of the optical fiber detection arm, an outer cladding surrounding the inner core and extending along the length of the optical fiber detection arm, and at least one reflector structure formed within said inner core, said reflector structure comprising first and second spectral reflectors having a terahertz range pitch spacing ($\Delta z$) between about 10 terahertz and 100 gigahertz, each of said spectral reflectors having an ultra-weak spectral reflection of <−50 dB said optical fiber detection arm terminated with an anti-reflection cut, and further comprising a narrow bandwidth interrogation system coupled to said optical fiber, said interrogation system comprising a narrowband tunable laser source having a tunable bandwidth of 100 gigahertz or less, said interrogation device interrogating said detection arm to detect changes in reflections and interference patterns caused by physical strain changes in said optical fiber and to output a strain profile for said optical fiber; and
    a shape-sensing unit coupled to each of said plurality of fiber optic sensing devices, said shape sensing unit receiving said strain profile from each of said plurality of fiber optic sensing devices and providing a three-dimensional shape profile of said shape-sensing bundle.

11. The fiber optic shape/position sensing device of claim 10 wherein said at least one reflector structure comprises a grating formed by a plurality of spectral reflectors.

12. The fiber optic shape/position sensing device of claim 11 wherein said grating comprising a continuous grating written along an entire length of each fiber.

13. The fiber optic shape/position sensing device of claim 11 wherein said interrogation systems individually interrogate each of said ultra-weak, terahertz-range reflector structures in each of said detection arms.

14. The fiber optic shape/position sensing device of claim 10 wherein each detection arm includes a plurality of spaced cavities.

15. The fiber optic shape/position sensing device of claim 10 wherein each detection arm includes a plurality of spaced gratings.

16. The fiber optic shape/position sensing device of claim 10 wherein said plurality of fiber optic sensing devices comprises three or more sensing devices.

* * * * *